(12) United States Patent
Sigler et al.

(10) Patent No.: US 8,590,768 B2
(45) Date of Patent: Nov. 26, 2013

(54) BATTERY TAB JOINT BY REACTION METALLURGY

(75) Inventors: David R. Sigler, Shelby Township, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 12/814,865

(22) Filed: Jun. 14, 2010

(65) Prior Publication Data

US 2011/0303736 A1    Dec. 15, 2011

(51) Int. Cl.
 *B23K 35/34* (2006.01)
 *B23K 31/02* (2006.01)
 *H01M 10/02* (2006.01)

(52) U.S. Cl.
 USPC ........... 228/193; 228/164; 228/197; 228/198; 428/650; 428/674; 429/156; 429/179

(58) Field of Classification Search
 USPC .......... 228/164, 193, 197, 198; 428/650, 674; 429/156, 179
 See application file for complete search history.

(56) References Cited

U.S. PATENT DOCUMENTS

| | | | | |
|---|---|---|---|---|
| 3,993,238 A | * | 11/1976 | Brook et al. ................... | 228/198 |
| 5,190,596 A | * | 3/1993 | Timsit .............................. | 148/23 |
| 5,464,146 A | * | 11/1995 | Zaluzec et al. ................ | 228/208 |
| 5,961,853 A | * | 10/1999 | Thornton .................... | 219/85.14 |
| 2005/0136270 A1 | * | 6/2005 | Besnoin et al. ............... | 428/469 |
| 2009/0001056 A1 | * | 1/2009 | Takahashi et al. ........... | 219/86.7 |
| 2010/0258537 A1 | * | 10/2010 | Sigler et al. .................... | 219/118 |
| 2011/0274964 A1 | * | 11/2011 | Tuffile .......................... | 429/156 |

FOREIGN PATENT DOCUMENTS

WO        WO 9631312 A1 * 10/1996

OTHER PUBLICATIONS

Metals Handbook, 8th Edition, published by American Society for Metals, 1971, p. 643-659.*
ASM Handbook Committe, Welding and Brazing; Metals Handbook; 8th Edition, vol. 6; American Society for Metals, Metals Park, Ohio 44703, 2 pgs.

* cited by examiner

*Primary Examiner* — Devang R Patel
(74) *Attorney, Agent, or Firm* — Dinsmore & Shohl LLP

(57) ABSTRACT

Copper metal or metal alloy workpieces and/or aluminum metal or metal alloy workpieces are joined in a solid state weld by use of a reactive material placed, in a suitable form, at the joining surfaces. Joining surfaces of the workpieces are pressed against the interposed reactive material and heated. The reactive material alloys or reacts with the workpiece surfaces consuming some of the surface material in forming a liquid-containing reaction product comprising a low melting liquid that removes oxide films and other surface impediments to a welded bond across the interface. Further pressure is applied to expel the reaction product and to join the workpiece surfaces in a solid state weld bond.

22 Claims, 6 Drawing Sheets

BATTERY TAB JOINT BY REACTION METALLURGY

STATEMENT OF RELATED CASES

This application related to U.S. application Ser. No. 12/420,927, entitled Welding Light Metal Workpieces by Reaction Metallurgy, filed Apr. 9, 2009, which is incorporated herein by reference.

TECHNICAL FIELD

This invention relates generally to welding processes, and more particularly to solid-state welding processes for joining workpieces of metal or metal alloys such as aluminum metal or alloys or copper metal or alloys.

BACKGROUND OF THE INVENTION

The joining of metals such as aluminum alloys or copper alloys is complicated by the presence of rapidly forming oxide layers as well as their inherently high electrical and thermal conductivity. Spot welding can be difficult and requires preparation of the workpiece surface, high currents, high forces, and mechanically well-aligned and stable electrodes. Short electrode life is common because of reaction between the aluminum workpiece alloy and the copper electrode or welding of the copper workpiece alloy to the copper electrode. The resultant weld between aluminum workpieces can have high strength, but poor high cycle fatigue performance under some conditions.

Lithium batteries for vehicle applications require a process to join the battery cells to a conductor or bus bar. The battery cells typically use thin aluminum and copper sheets as electrode substrates. These electrode sheets incorporate an extension, known as a tab, which extends outside of the cell pouch and is used to join the electrode sheet to the copper conductors or bus bars during battery assembly. Two types of tab materials are commonly used in battery construction: aluminum and copper. In some cases, the copper tabs and/or copper conductor may be coated with a thin layer of nickel to enhance corrosion resistance and joining while aluminum tabs are coated with an anodization layer.

Joining the thin tab materials to the much thicker copper conductor is difficult for several reasons. First, the stack-ups require joining several separate pieces of metal in one operation, e.g., three separate tabs to one conductor. Second, one of the stack-ups includes a metal combination that is known to form brittle intermetallics, i.e., copper and aluminum. Third, the thickness ratio between the conductor and tabs is high, typically at least about 5:1.

Ultrasonic welding has been used for this application with some success. It enables the joining of dissimilar metals and is capable of joining materials with significant differences in sheet thickness. However, there is considerable difficulty in joining stack-ups that contain more than two sheets because the ultrasonic energy, i.e., vibrations parallel to the sheet surface, does not transfer well across the sheet-to-sheet interfaces. The top sheet couples well to the ultrasonic energy source because it is in direct contact with the ultrasonic tool or sonotrode. Hence it reacts strongly with the adjacent sheet. However, sheets located lower in the stack, including the conductor bar, do not receive as much ultrasonic energy, and the resulting weld may not be as strong.

Mechanical fasteners such as screws or clamps have also been used. They rely on very low contact resistance to achieve good electrical conductivity. However, contact resistance can degrade over time through the build-up of surface contaminants, e.g., oxides, or through degradation of the fastener.

Soldered joints can also be used. However, the use of solders with fluxing agents, particularly for aluminum, can result in the formation of corrosive flux residue that will degrade the surrounding materials or joint over time if not removed by cleaning operations. These operations add cost and, in some cases, may not be possible depending on the assembly sequence.

There remains a need for a process for welding battery cell tabs to conductors or bus bars.

SUMMARY OF THE INVENTION

Workpieces of metal or metal alloys, such as aluminum and copper, are joined by a reaction metallurgy joining process. A solid state weld is formed by placing a layer of a suitable reactive material between the surfaces to be welded for the purpose of alloying with the surface material and forming a transient, movable, liquid-containing reaction product (often a eutectic or near-eutectic mixture) in-situ. The formation of this liquid-containing phase serves to remove oxides and other barriers to solid state welding at the intended weld interface. The interface region of the assembled workpieces is heated to form the mobile reaction product, but maintained at a temperature below the solidus temperature of the workpieces. In the process of serving its surface preparation function, the reaction product is squeezed from the interface, and the cleaned, heated, contacting solid surfaces are pressed together to form a solid-state weld.

The process may be used to join aluminum or copper workpieces (metals or alloys including nickel plated copper) to other aluminum or copper workpieces (metals or alloys including nickel plated copper).

The reaction metallurgy joining process may be used to weld many different workpiece forms. The facing surfaces may be provided, for example, by flat battery cell tabs and conductors having a flat surface, or by shaped surfaces.

The application of this reaction metallurgy joining process will first be described with respect to the joining of workpieces of similar metal alloys, for example the joining of one or more copper alloy battery cell tabs to a copper alloy conductor. The joining surfaces for the workpieces may first be cleaned of previous processing material and other foreign material that impedes good contact between the surfaces to be welded.

The reaction metallurgy joining process includes the placement of a layer of a reactive material, which may comprise a metal element or alloy, between the copper battery cell tabs and the copper conductor. This material, placed between and against joining surfaces, will be heated and used to react, typically by diffusing into and alloying with workpiece elements, with the facing workpiece surfaces to form a reaction product that includes a suitable amount of a low-melting temperature liquid (i.e., the liquid is formed below the solidus of either facing workpiece). The reaction product is formed to remove oxides and other chemical impediments to a weld between the copper-based (or aluminum-based) material of the workpieces. In addition to liquid, the reaction product may include formed solids, or entrained solids, or the like, but the low-melting temperature liquid is a necessary part of the reaction product. The composition and amount of the interposed reactive material is predetermined to form a suitable amount of the liquid reaction product and of suitable fluidity for it to cleanse the surfaces and then to be substantially squeezed (with any solids included with it) from the interface. This is accomplished at a temperature below the solidus temperature(s) of the workpieces. The reaction of the interposed reactive material with the workpiece surfaces thus removes material from the workpieces. This may change critical dimensions of the workpiece(s). Accordingly, the amount of inserted reactive material is predetermined, such as by calculation, by experience, or by experiment, to prepare workpiece surfaces without excessive removal of workpiece material. In addition, the workpiece material can be designed with additional thickness to compensate for the thinning that occurs during the joining reaction.

The inserted reactive material may be in the form of a thin sheet, wires, screens, flakes, or particles. In the embodiment of joining copper alloy battery cell tabs to a copper conductor, the added material is selected to contact and react with copper in the facing sheet surfaces to form a eutectic-like, low-melting-point phase(s) with a melting point below about 1085° C. There are a number of elements that form low melting-point-liquids with copper. These include Al, Si, and Zn. Al and Si both form eutectics with Cu, and these have melting points of 548° C. for Cu—Al and 802° C. for Cu—Si. The Cu—Zn system has a wide range of phases with low melting points, from 420° C. to 902° C. Besides pure metals, alloys can be used as the additive that would include combinations of the substrate base metal with the additive elements, e.g. Cu—Al or Cu—Si alloys. In addition, additives composed of Cu—P alloys could be used to join copper substrates since the eutectic between Cu and P has a melting point of 710° C., well below the melting point of Cu, and are known to reduce and/or remove surface oxides on copper.

For joining of nickel-plated copper tabs to each other and/or to a nickel-plated copper conductor, the additive should form a eutectic-like liquid with a melting point below about 1085° C. and should also react with and locally remove the nickel plate. The nickel plate is typically about 10 microns thick, or about 5% of the copper tab sheet. As stated above, the elements that form low melting-point-liquids with Cu include Al, Si, and Zn. Al and Si both form eutectics with Cu and these have melting points of 548° C. for Cu—Al and 802° C. for Cu—Si. The Cu—Zn system has a wide range of phases with low melting points, from 420° C. to 902° C. In order to break through the nickel plating effectively, the additive should not form high melting point intermetallics with nickel and should have a low temperature eutectic with it. Al has a eutectic with Ni at 640° C., but forms nickel aluminide intermetallics ($Al_3Ni$). For the reaction to be effective, the aluminum addition and nickel layer should not produce excessive amounts of $Al_3Ni$ (42 wt % Al). To ensure a minimum of 50% liquid as the reaction product, sufficient Al should be available so that the overall composition of the reaction product is less than about 30 wt % Ni. The minimum volume of pure Al additive required, assuming a 10 micron thick nickel plate on both substrates, would be only about 70% of the volume of the nickel plate or, assuming a uniform Al foil, the foil would only be about 14 microns thick (Al density of 2.70 $g/cm^3$ and Ni density of 8.90 $g/cm^3$). Thicker foils would result in the formation of greater amounts of liquid. This would ensure that the eutectic liquid could dissolve away the nickel plate and begin reaction with the substrate without forming excessive amounts of high melting point intermetallics. Silicon would not work as well since the lowest temperature at which Ni and Si form a liquid is 954° C. Zinc would also not work as well because only very zinc rich alloys have low melting points, e.g., γ phase with 80 wt % Zn has a melting point of 881° C. Besides pure metals, alloys can be used as the additive that would include combinations of the substrate base metal with the additive elements, e.g., Cu—Al alloys.

For joining of aluminum electrodes to a copper conductor (or copper electrodes to an aluminum conductor), the additive should form a low-melting-point material with a melting point below that of aluminum, i.e., 660° C. Al can be used as the additive since it forms a eutectic with Cu at 548° C. Once the eutectic is formed and begins reaction with the substrate, the reaction may continue by consuming both the aluminum sheet electrode and copper conductor materials. In this case, control of the joining process could be maintained either by use of the appropriate time to heat the joint or, preferably, displacement control of the platens that would terminate the reaction once a set amount of sheet/conductor material was consumed.

To join aluminum battery cells tabs (metal or alloys) to each other, the additive should form a low-melting-point liquid with aluminum, which has a melting point of 660° C. Suitable additives include copper, silicon, zinc, and magnesium. The minimum solidus temperatures of binary alloys formed by aluminum and these elements are 548° C. for Cu—Al, 577° C. for Si—Al, 381° C. for Zn—Al, and 437° C. for Mg—Al. Alloys including these elements may be used as the reactive material provided a suitable liquid volume is formed at a temperature below the solidus temperature of the workpieces. Alloys may be used as the reactive material that could include combinations of the workpiece base metal with the additive elements, e.g. Al—Si alloys or Al—Si—Cu alloys for joining aluminum alloy components.

As another embodiment of the invention, mixtures of particles with distinctly different compositions which react to form a liquid containing phase could be used. A suitable mixture of copper and aluminum particles, for example, would produce a liquid that reacts with and wets aluminum joining surfaces, but produces a substantial amount of reaction product without consuming excessive amounts of the components to be joined.

In some embodiments of the invention, the joining face of one or both of the workpieces may be formed with surface features such as dimples, ridges, shallow pockets, or cavities for holding interfacial reactive material. In the case of cavities, they may be bounded by pads or projections for engaging a facing workpiece surface. These surface features of workpiece material are shaped to hold reactive material temporarily until the assembled workpieces are heated to commence the welding process. Then, the reactive material reacts with the workpiece surface features to form the reaction product with its low-melting-point liquid and level the workpiece surface for the weld. In the case features formed into a sheet of uniform thickness, such as dimples or ridges, the features would hold the reactive material temporarily until the assembled workpieces are heated to commence the welding process. Then, the reactive material reacts with the workpiece surface, spreading over the entire surface as the features are deformed under load, to form a continuous weld.

The workpieces with interposed reactive material may be supported on suitable frames, fixtures, hangers, or the like. A heating apparatus and pressing apparatus are used to press the workpieces against the reactive material, and the reactive material is heated to a temperature below the solidus temperatures of the workpieces but to a temperature suitable for promoting reactions forming the reaction product and for cleaning the metal surfaces. In many embodiments of the invention, the assembled workpieces may be supported directly on mechanisms or apparatus for controlled heating and pressing of the workpieces. For example, suitably shaped heating blocks may be used to engage the back sides (i.e., non-joining sides) of the workpieces. Such heating blocks (which may, for example, be electrically resistance heated blocks) are shaped to engage the outward-facing workpiece surfaces, to press the joining faces of the workpieces against the co-extensively placed reactive material, and to conduct heat through at least one of the workpieces to the reactive material. But the practice of this invention is not limited to resistance heating. Many other heating means and energy imparting means may be used to heat the reactive material placed at the surfaces to be joined.

This reactive metallurgy practice is very useful for welding workpieces together. In accordance with this invention, the method is practiced to manage the dimensions of the welded article and to minimize distortion of the members at the welded interface. This may be of particular concern when the workpieces have thicknesses of only a few millimeters or less, for example, battery cell tabs which are typically about 0.2 mm thick. Such dimensional control is accomplished by controlling the amount of workpiece material consumed by the reactive material and discarded as reaction product, as well as controlling the amount of deformation experienced by the workpieces during joining. For the case of very thin material, for example, less than 1 mm thick, where a specific final material thickness is desired, the material could be produced at a greater thickness and then thinned by both the reaction and stress to the desired final thickness.

The temperature of the interface is closely controlled in the heating step to form the mobile reaction product while remaining below the solidus temperatures of the workpiece faces. For example, an AA6061 workpiece may have a solidus of about 582° C. while an aluminum-copper eutectic may melt at about 548° C. Thermocouples and temperature controllers may be used in controlling interfacial temperatures. Care should be given to the application of pressure at the interface to minimize distortion of the weld region. An applied first pressure may be utilized to form reaction product for cleaning the metal surfaces and then a second pressure to displace the reaction product from between the cleaned faces. But the pressures and workpiece displacement are held to levels that minimize unwanted deformation of the cleaned, and heated welding faces. Interfacial displacement may be controlled by servomotors, for example, acting on heater blocks, or by mechanical stops between the blocks.

Thus, the reactive metallurgy joining processes of this invention may be practiced to form solid-state welds between metal surfaces over a wide range of surface areas. The processes are applicable to sheet-to sheet welds and to the formation of welds between many other wrought and cast workpiece shapes.

The above and other advantages and new, useful results of the present invention will become apparent to those skilled in the art from the following detailed description and accompanying drawings.

DETAILED DESCRIPTION OF THE INVENTION

The invention relates to solid-state welding processes for joining metal or metal alloy workpieces. A reaction product comprising a mobile low-melting temperature liquid-containing material is temporarily formed between joining surfaces. The mobile material is formed as a reaction product between the surfaces to be joined and a preplaced material selected specifically for its ability to react with the base metal alloys. Under the action of an applied force, the reaction product is displaced from the joint and leaves behind cleaned, oxide-free aluminum or copper surfaces that, under continued pressure, form a metal-to-metal bond. The process is practiced to manage consumption and deformation of the facing surfaces of the workpieces.

In many embodiments of this invention, the process may be used to form solid-state welded interfaces between copper metal or alloy or aluminum metal or alloy workpieces and other copper metal or alloy or aluminum metal or alloy workpieces. Examples of aluminum-base alloys are AA1100 (solidus temperature of 643° C.), AA1060 (solidus 646° C.), and AA1350 (solidus 646° C.).

Figure 1A:
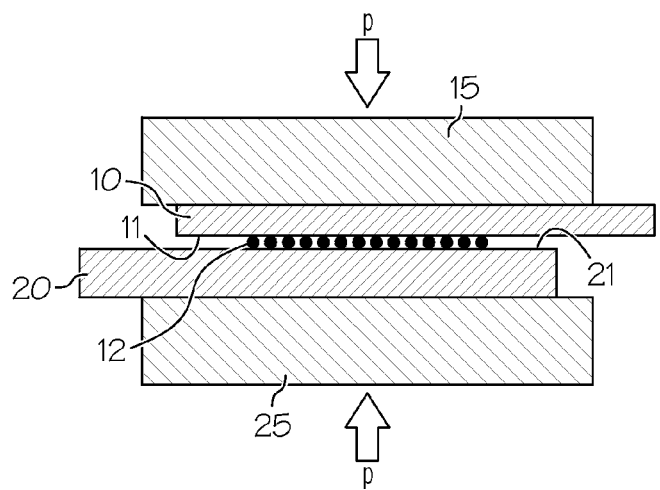
FIGS. 1A-1C show a schematic cross-sectional view of the process illustrating three stages in the development of the solid state joint. The sizes of workpieces and heating blocks are not necessarily drawn to scale but for illustration of embodiments of the welding process.
Figure 1B:
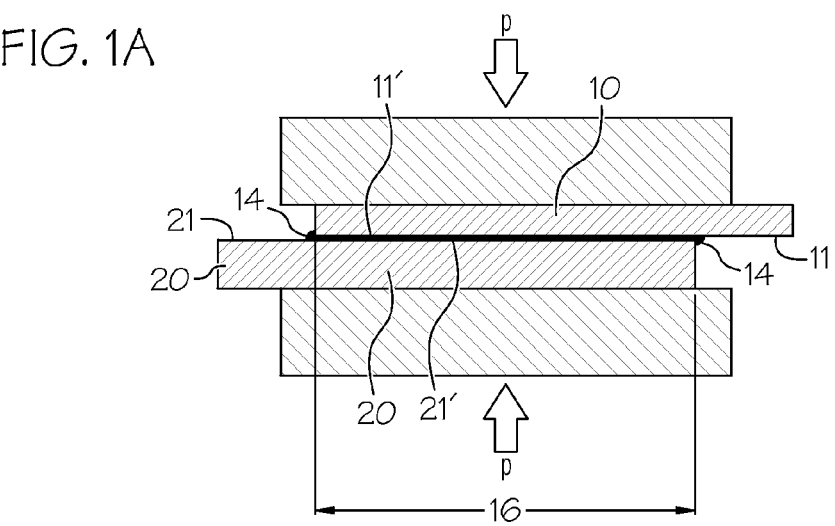
Figure 1C:
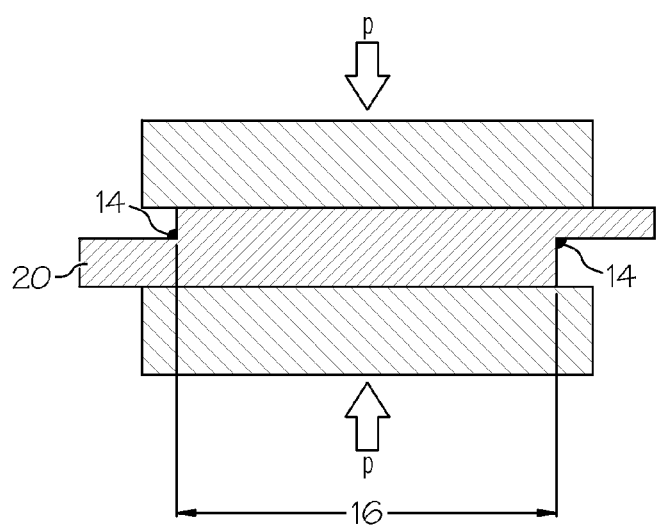

The process may often be used in welding sheets or other workpieces with relatively thin walls at the joint position. FIGS. 1A-1C are used to illustrate such embodiments.

In FIG. 1A, two metal workpieces 10 and 20, here shown in an overlapping configuration, are located between two support blocks 15 and 25 respectively with a layer of particulate reactive material 12 located between the intended bonding surfaces of workpieces 10, to be welded. Where the workpieces are formed of an aluminum alloy(s), the reactive material may, for example be elemental copper, magnesium, silicon, and/or zinc. Mixtures of these elements or alloys containing these elements may be used as the reactive material.

The depiction of a particulate form for the reactive material is not intended to be limiting. Alternate forms such as foil, wire, mesh or weaves could also be used, although, as brought out more completely in later sections of this specification, material forms with irregular geometry such as particles, wires or weaves may offer advantages over foil in some specific embodiments. Reactive material 12 may be conveyed to the joint area manually or robotically as either a solid body or, particularly for particulate forms, entrained as a dispersion or a paste in a dispensable fluid which is either benign to the process or which will evaporate during processing. These procedures are well known to those skilled in the art of joining.

The workpieces are subject to a first pressure p applied through the support blocks and directed normal to the support blocks, sufficient to establish at least good mechanical contact between the contacting workpiece surfaces 11 and 21 and reactive material 12.

In FIG. 1B, the workpieces 10 and 20 and the particulate reactive material 12 have been heated, while still under pressure p, to a process temperature T sufficient for reactive material 12 to diffuse into, or otherwise interact with, the aluminum alloy composition or copper composition of surfaces 11 and 21 of the workpieces to form a reaction product 14. Reaction product 14 includes a low melting point liquid, incorporating the original reactive material and additional elemental components introduced by the reaction with and partial dissolution of the surfaces 11, 21 of workpieces 10, 20. This low melting temperature liquid may also comprise solid oxides and the like removed from surfaces 11 and 21. It will be appreciated that the particulate reactive material 12 will have been selected to be of such an initial composition that the addition of alloying elements from workpieces 10 and 20 will not raise the melting point of reaction product 14 to a temperature greater than the process temperature T. More preferably, the addition of further elements to reactive material 12 to create reaction product 14 will result in a further depression of the melting point of reactive material 12 such as would be observed in a ternary, quaternary or higher component eutectic alloy.

As stated, the reactive material 12 may be used in different and/or combined solid forms such as particles, wires, screens, sheets or films. But the composition and shape of the interposed material is selected to disrupt oxide films and other surface compositions on facing surfaces (such as surfaces 11, 21) of the aluminum or copper metal or alloy workpieces to be welded to form the fluid liquid-containing reaction product 14. More rapid formation of reaction product 14 may be promoted by additional mechanical disruption of oxide films occurring between the assembled facing surfaces 11 and 21 and interposed reactive material 12 during heating. This may be accomplished using mechanical motion which may be motions transverse to the joining surfaces and ultrasonic excitation which may be imposed in a convenient location remote from the weld zone and transmitted to the weld zone through support blocks 15 and 25.

It is preferred that the fluidity of reaction product 14, with its liquid or liquid and solids, will result in its distribution, under applied pressure p, over the entire pressurized region of contact between workpieces 10 and 20 to create a reaction zone 16 which may be more extensive than the region over which particles of reactive material 12 were originally distributed.

The practice of the invention has been described when higher melting point reactive materials which are solid at reaction temperature T are employed. It will be appreciated that low melting point reactive materials which are liquid at reaction temperature T will be equally suitable.

As a result of the applied pressure p, the liquid-containing reaction product 14 will have been partially expelled from the reaction zone 16, but, in the anticipated practice of the invention, a thin film of molten reaction product 14 will be present between oxide-free workpiece surfaces 11' and 21' preventing them from coming into contact with one another. More significantly, the thin film of molten reaction product 14 will prevent ingress of atmospheric oxygen into the reaction zone 16 and thereby enable continued freedom from oxidation of surfaces 11' and 21'.

In FIG. 1C, the joint configuration shown in FIG. 1B is subjected to a second pressure P (or more than two pressures, if desired), generally significantly greater than p, and sufficient to substantially fully expel reaction product 14 from the reaction zone 16, thereby enabling oxide-free workpiece surfaces 11' and 21' to achieve intimate contact while still at operating temperature T and hence generate a solid state bond in reaction zone 16 with remnant reaction product 14 at its periphery.

Alternatively, the joint configuration could be subjected to one applied pressure under which the reaction takes place and which substantially fully expels the reaction product. However, two pressure levels or one pressure level and limited displacement (as described below) are preferred.

Finally the joined workpieces are allowed to cool to about room temperature and reaction product 14 permitted to solidify. The reaction product 14 may then be removed from the periphery of the weld zone.

It will be appreciated that with application of pressure p or pressure P, an associated displacement will result. As noted above, it is believed that this displacement associated with pressure p is beneficial in fracturing or rupturing oxide layers which would otherwise inhibit reaction. However displacement associated with pressure P may be detrimental since the pressure P will be applied to the heated regions of workpieces 10 and 20 in addition to reaction zone 16 where reactive material 12 has been transformed to reaction product 14. The heated regions will be softer than the adjacent cold regions and therefore may be more readily indented by support blocks 15 and 25. Any such impression will result in a thinning of the workpieces in the joint and may thus reduce its strength. Inasmuch as portions of workpieces 10 and 20 will already be unable to contribute to the joint due to their consumption in reacting with reactive material 12 and subsequent expulsion from the joint, further reduction in joint strength due to thinning may be undesirable.

The design requirements for the joint and of the metallurgy of the overall system—reactive material and workpieces—are considered and the process is practiced to limit thinning or deformation at the workpieces interface to a suitable extent. For example, consider the bonding of an aluminum sheet, 0.5 mm thick, to an identical sheet using copper foil as the reactive material and restricting the maximum loss of aluminum to 0.1 mm from each sheet. With these conditions and constraints, and knowing that the reaction product (14) formed will be an Al—Cu eutectic with a composition of about 34 wt. % copper, it is straightforward to compute that the thickness of the copper foil should be less than 0.03 mm. This assumes, of course, that foil of the desired thickness is readily available. Further, when considering more complex alloy systems, the composition of the resulting reaction product (14) may not be known a priori. In consideration of both issues, it is desirable to identify an alternate approach.

Hence in a second embodiment of this invention, rather than imposing a pressure P, it is preferred to impose a displacement δ, sufficient to achieve the desired solid state weld but intended to limit or minimize joint thinning. The practice of the invention will then call for a transition in control of the support blocks from load control (application of pressure, p)

to displacement control (imposition of displacement, δ) as the process proceeds. Means for achieving this are well known to those skilled in the art.

FIG. 1 showed workpieces 10 and 20 of generally flat or smooth joining surfaces such as might be observed in rolled or extruded products. However, it is contemplated that this invention may also be practiced where a joining surface is formed with shallow depressions or recesses for holding reactive material and placement against a complementary facing joining surface of another workpiece. For example, heavier wrought or cast products offer the opportunity to introduce shallow receptacles for retaining reactive material temporarily in an otherwise flat or featureless joining surface of a workpiece without requiring a separate machining step. The low confining surfaces of the walls or sides of the receptacles conveniently provide aluminum alloy or copper alloy material for reaction with the placed reactive material.

Figure 2:
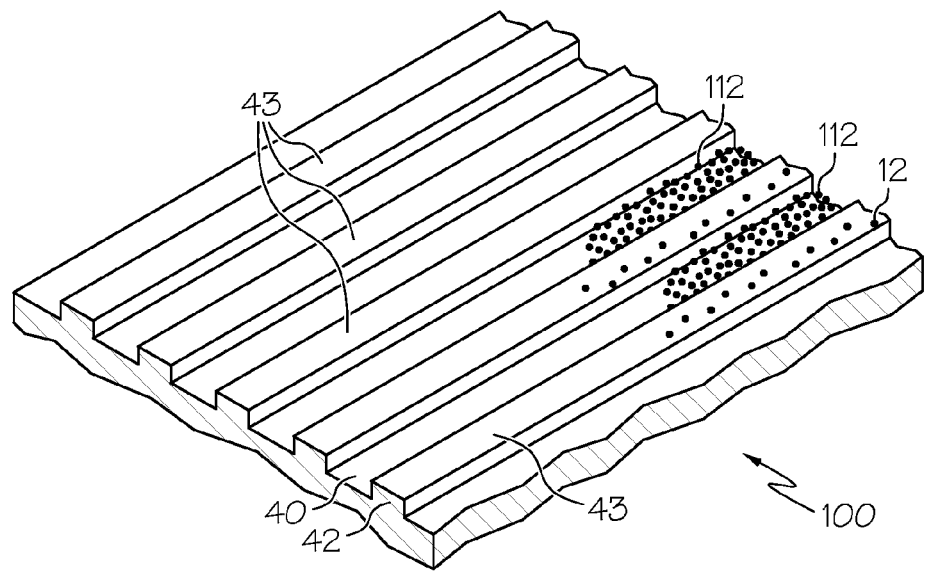
FIG. 2 shows a first embodiment of integral surface features which may be incorporated into a joining surface of one or both of the workpieces to receive reactive material and to enable better control of the overall joint thickness.

An example of such depressions or recessions is shown in FIG. 2. FIG. 2 is a fragmentary view of a workpiece with a portion of an intended joining surface of the workpiece. In this embodiment, the workpiece may be an extruded or cast object in which a joining surface portion 40 is formed with several parallel strips 42 projecting a small distance (e.g., a millimeter or so) above the intended normal level of the workpiece surface 40. Here joining surface 40 is part of a larger extruded or cast workpiece. Discrete particles (or wires or other shapes) of reactive material 12 are shown both on the upper surfaces 43 of strips 42 and, at 112, between the strips 42. When this workpiece is assembled against a second workpiece, surfaces 43 of strips 42 may initially engage the opposing joining surface. When the joining surfaces of the assembled workpieces are pressed together and the surfaces are heated, the reactive material 12 and 112 may react with the strip 42 material and with a facing surface to form a reaction product with its content of low melting point liquid. The strips 42 may be consumed in this reaction to provide more surface area for the weld to be formed between the workpieces. The amount of reactive material and the size and number of strips (or other depression confining material) is preferably predetermined to remove the strips and facilitate expulsion of the mobile reaction product.

Such distribution of reactive material 112 in depressions or cavities may be beneficial in many practices of the invention. The increased contact between reactive material and cavity surfaces may enhance interactions between reactant and workpiece joining surface. A greater surface area of the surface will be exposed to reactive material for removal of the surface oxide layer. And, even if not totally consumed by reactive material, any remnant surface projections may be deformed by pressure P to reduce overall deformation of a workpiece and to yield a generally flat interface capable of undergoing the desired solid-state bonding.

Figure 3:
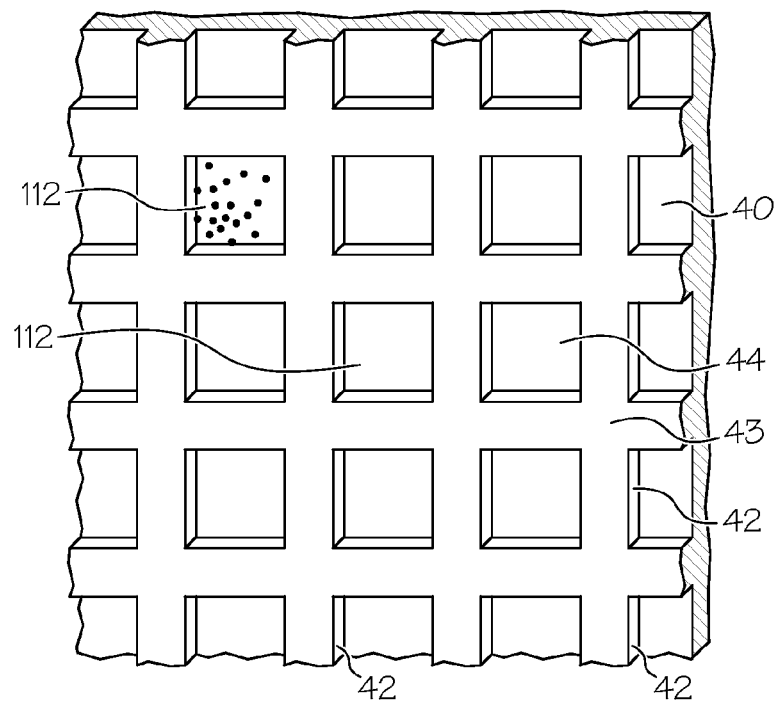
FIG. 3 shows a second embodiment of an integral surface feature which may be incorporated into one or both of the workpieces to receive reactive material and enable better control of the overall joint thickness.

FIG. 3 shows a further variant of such a workpiece joining surface in which criss-crossing strips or walls 42 are formed on a workpiece surface 40 to define shallow cavities 44 for containing reactive material particles 112. It will be appreciated that the upper surfaces 43 of strips, although depicted as flat may be fabricated with a range of topographies, particularly those topographies which may enable more effective rupture of the oxide layer on the opposing workpiece. These topographies include those that are produced by sand or grit blasting with high pressure air to provide a coarse, roughened surface texture.

Another example of features such as depressions or recesses would be the formation of dimples, ridges, or other features in a thin sheet of constant thickness. In this embodiment, the workpiece may be a stamped sheet of foil in which a joining surface portion is formed with features projecting a small distance (e.g., a 0.1 millimeter or so) above the intended normal level of the workpiece surface. Here, the joining surface is part of a larger sheet tab. Discrete particles of reactive material are embedded into the depressions formed by the features. This acts as a way of providing a uniform distribution of the reactive material where it may be more difficult with a smooth, featureless surface. When this workpiece is assembled against a second workpiece, the surfaces may initially engage the opposing joining surface. When the joining surfaces of the assembled workpieces are pressed together and the surfaces are heated, the reactive material may react with both workpiece surfaces to form a reaction product with its content of low melting point liquid. The workpiece surfaces would be uniformly consumed in this reaction to provide more surface area for the weld to be formed between the workpieces. The amount of reactive material and the size and number of depressions confining material is preferably predetermined.

The foregoing description is intended to describe a process applicable to a wide range of workpieces. The metal element or alloy compositions of the reactive material are determined based on the composition(s) of the aluminum or copper metal or alloy(s) making up the joining surfaces of the respective workpieces and should be selected such that it satisfies the following criteria:

a. the solidus temperature of the reactive material (or individual component particle of a multi-component particle mixture) introduced into the gap between the pressurized region of the workpieces may be higher or lower than that of the workpieces. But the reactive material, when reacted or alloyed with the workpieces, should generate an alloy (reaction product) which has a solidus temperature lower than that of the workpieces so that a process temperature T for forming the reaction product will not lead to excessive workpiece softening;

b. the alloy formed by reaction of the reactive material with the workpieces' surfaces, when molten, must at least wet the workpieces' surfaces in cleaning them of oxides and other impediments to the formation of a solid state weld between the cleaned surfaces. More preferably, it will also wet the oxidized workpieces surfaces so that the molten alloy may spread and interact with the workpieces over the entire pressurized joining region; and c. the alloy formed at the conclusion of the process, when the maximum fraction of the workpiece has been dissolved and when the alloy may incorporate particles of the pre-existing workpiece oxide, should have a viscosity such that it may be substantially fully expelled from the gap between the workpiece pressurized region by the applied pressure P.

Subject only to the above specifications, this invention may be practiced on workpieces of similar composition, e.g., aluminum alloys of identical or differing composition or alloy series; workpieces of dissimilar composition, e.g., aluminum and copper; and coated materials, either to themselves or other alloys, e.g., nickel-plated copper to aluminum.

For coated materials, the quantity and composition of reactive material 12 may be chosen to remove all of the coating, including any reaction products formed between the coating and the substrate. In special cases, it may be possible to remove only a part of the coating if the bond between the coating and the substrate is sufficiently strong or if the beneficial effects of the coating are desired in the bond. It will, of course be appreciated that the bond between the substrate and the coating must itself be capable of solid-state welding. As an example, for an anodized coating on aluminum, complete removal of the coating would be desired since wetting of the aluminum and formation of a metal-to-metal bond would not be possible with the anodization layer present.

Figure 4:
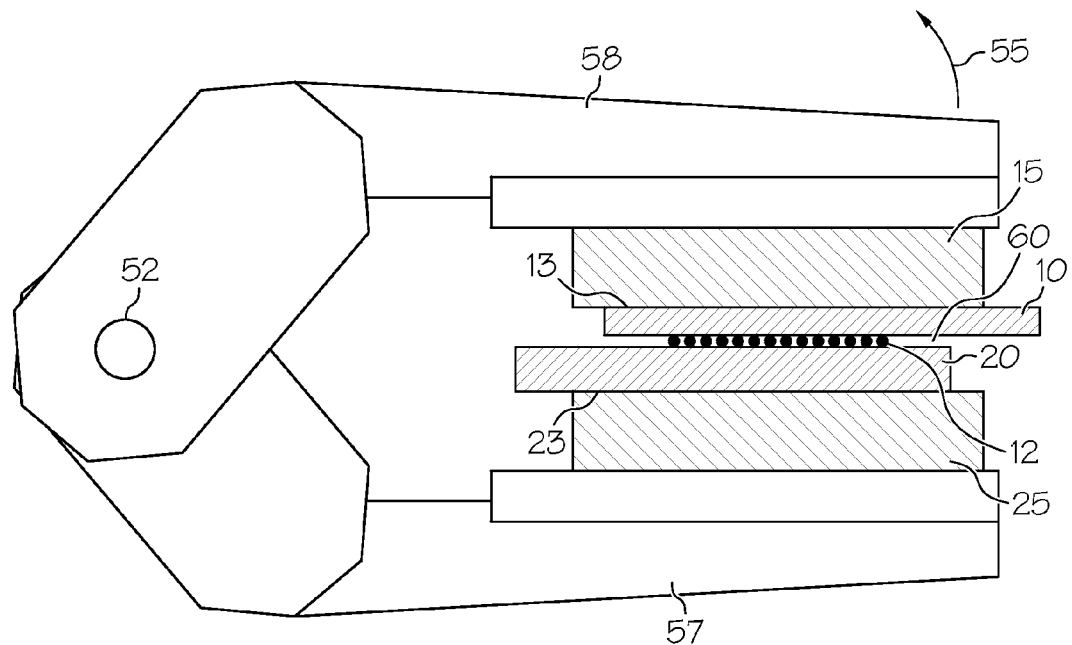
FIG. 4 is a schematic illustration of an apparatus (electrical resistance weld gun arms) for heating and applying pressure to the welding interface in an embodiment of the process to join metal components.

FIG. 4 shows another embodiment for practicing the invention and depicts the elements shown in FIG. 1 incorporated in a support frame which may be a spot welding servo gun. The configuration of mechanical features shown in FIG. 4 is exemplary only and should not be construed as limiting the scope of the invention which may be practiced using spot welding servo guns actuated in different manners, as well as by devices and mechanisms other than spot welding servo guns. However the use of a spot welding servo gun is advantageous since the process requires a programmed application of forces and/or displacements, which is a capability readily available in current servo gun designs.

To fabricate a joint as described between workpieces 10 and 20 the following procedure would be followed:

- position an appropriate quantity of reactive material 12 in the intended joint area; open throat 60 to permit loading of workpieces 10 and 20 with particulate reactive material 12 therebetween. In the arrangement shown in FIG. 4, this would be accomplished by rotating moveable arm 58 about pivot 52 in the direction indicated by arrow 55 until the gap 60 between moveable arm 58 and fixed arm 57 was sufficient to introduce the workpieces;
- close throat 60 by rotating moveable arm 58 about pivot 52 in a direction opposite to that indicated by arrow 55 to enable support blocks 15 and 25 to contact the surfaces 13 and 23 of workpieces 10 and 20 and apply a pressure p;
- heat the workpieces 10, 20 and particulate reactive material 12 to temperature T; after a time sufficient to enable full reaction of particulate reactive material 12 with workpieces 10 and 20, apply increased force P—or, in an alternate embodiment, specified displacement δ—to expel reacted reaction product 14;
- discontinue heating; and
- open throat 60 to remove welded workpieces.

Heating may be accomplished using a variety of methods. For example, resistance heating may be used with support pads 15, 25 to pass a predetermined current for a predetermined time through the pressurized region. Alternatively the support pads may be externally heated, for example by the incorporation of cartridge heaters (not shown) with reliance on conduction to convey the heat to the workpiece interfaces 11 and 21, i.e., conductive heating. Finally, it may be feasible to incorporate induction coils to use induction heating.

Similarly a number of approaches to cooling the workpieces following the creation of a joint between them may be adopted. Note that, although reaction product 14 will still be molten at the conclusion of the process, it contributes nothing to the joint strength which is entirely attributable to the solid state weld formed between substantially oxide-free surfaces 11' and 21'. Thus, the simplest procedure is to remove the joined workpieces while still hot and allow them to air cool out of the tool. This may not be possible if the process temperature T is so high that the hot joint is unable to support handling or gravitational loads on the part. In this case, the part could remain in the tool and air cool until the joint is strong enough. Alternatively, the support plates 15 and 25 could incorporate cooling coils to circulate chilled water to extract heat more efficiently from the joint. Finally, the part, if fully supported by other tooling and supports, could remain in position with the throat 60 opened to disengage the support plates from the joint so that it could air cool or, alternatively, be subjected to enhanced cooling through air blast or water spray/mist cooling.

Figure 5:
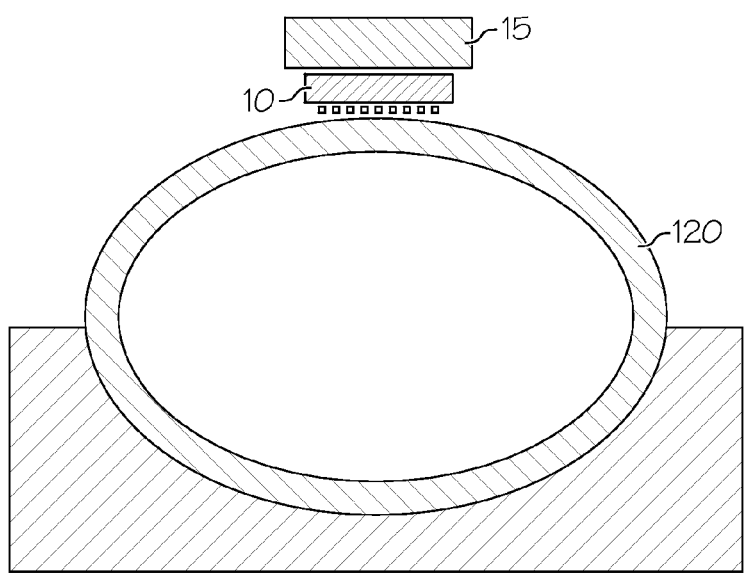
FIG. 5 is a schematic illustration of an embodiment of the process of two workpieces to be welded where the geometry inhibits or prevents two-side access for heating the welding interface.

In the process described previously, it was implied that the joint was readily accessible from both sides. While two-side access is broadly desirable, the process may also be practiced where access is more restricted. For example, FIG. 5 shows a situation where it may be desirable to attach a component to a closed section such as a tube. Provided the tube 120 is securely fixtured and provided it is possible to supply enough heat and pressure, the process may still be practiced. In this example, support 15 could be mounted on a robot capable of generating the required pressures or displacements, and heating would be accomplished from one side only.

Figure 6:
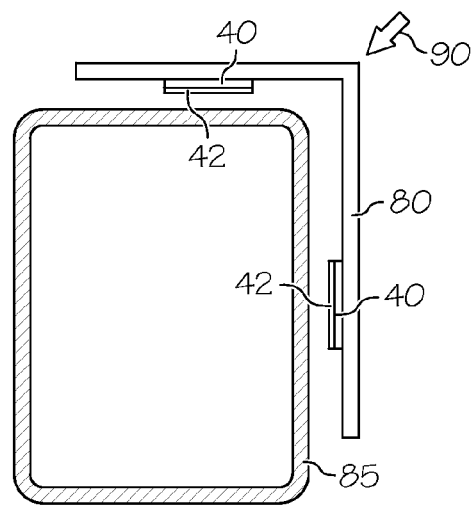
FIG. 6 illustrates an embodiment of the process where multiple joints between two members on non-parallel surfaces are to be formed.

FIG. 6 shows a similar situation broadened to illustrate a situation where an L-shaped casting 80 incorporating features such as are shown in detail in FIG. 2 is to be attached to two surfaces of a closed rectangular section 85.

Note that the two joining surfaces 40 and associated projections 42 (like those illustrated in FIG. 2) are mounted orthogonally to one another, and thus require that pressure(s) p and P be applied in the direction indicated by arrow 90 to ensure attachment on both surfaces. In this case, the joints could be made simultaneously by using individual heat sources for each joint.

An example of a joint fabricated from aluminum sheets with copper foil as the reactive material was discussed previously, but as noted, the reactive material need not be a pure metal, and may be an alloy with a lower melting point than the workpieces.

Figure 7:
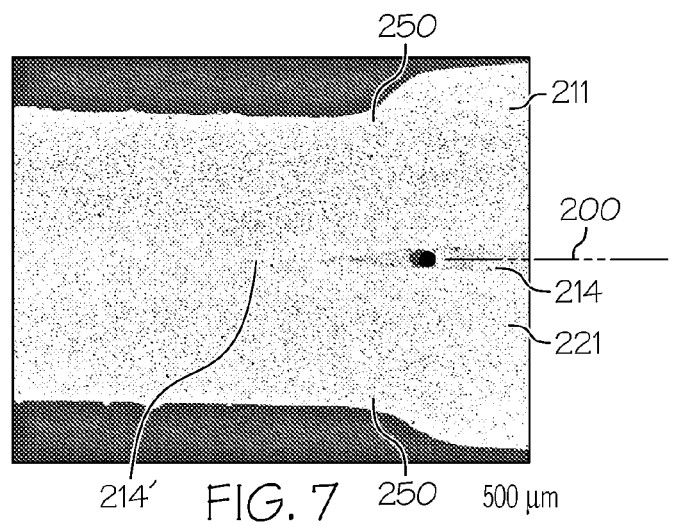
FIG. 7 shows a low magnification photomicrograph of a partial section of a weld made using the subject invention illustrating the joint, some entrapped braze alloy and expelled braze alloy.

An experimental solid state bond formed between sheets of aluminum 3003-H14 alloy (solidus temperature approximately 640° C.) using an aluminum 4145 braze alloy (melting range 521-585° C.) and generally following the practice of the invention is shown in FIG. 7. Original workpieces 211 and 221 are welded along a line 200 and expelled alloy 214 is shown at the edge of the joint. Surface depressions associated with both the consumption of workpiece material by the reactive material and with the loads applied by the support blocks (not shown) are indicated as 250. It may be noted that complete expulsion of alloy 214 has not occurred and that a small pocket of remnant alloy 214' is shown trapped in the joint.

Figure 8:
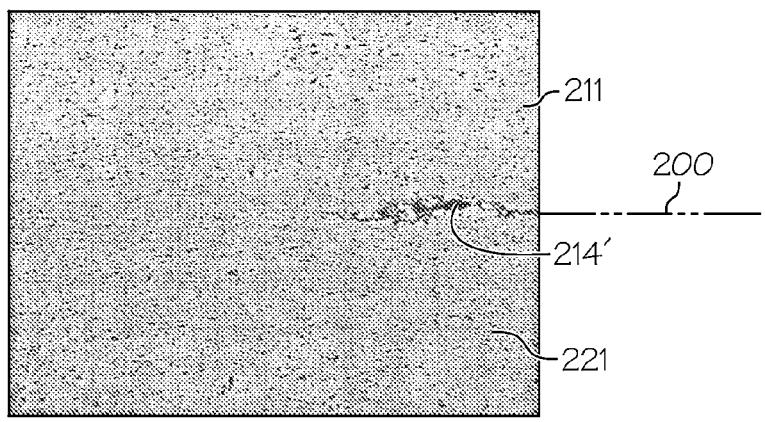
FIG. 8 shows a high magnification photomicrograph of a portion of the weld shown in FIG. 7 illustrating the joint and some entrapped braze alloy.

FIG. 8 shows a higher magnification view of the joint shown in FIG. 7 (remnant alloy 214' is commonly shown on both micrographs) illustrating that no interface between the workpieces 211 and 221 may be detected consistent with the practice of achieving a solid-state joint.

Figure 9C:
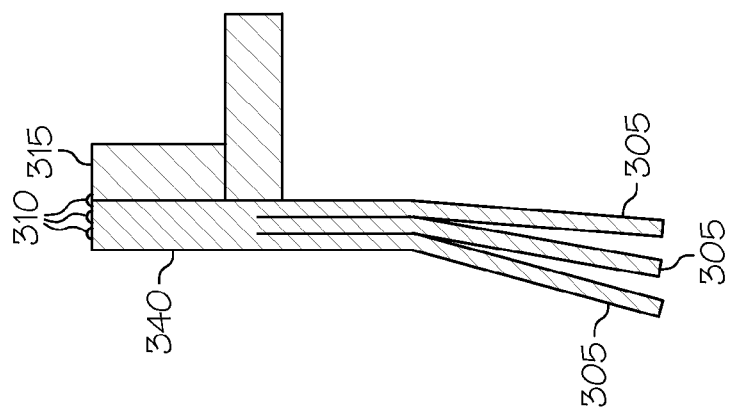
FIGS. 9A-C show a schematic cross-sectional view of another embodiment of the process illustrating three stages of development of a joint of copper battery cell tabs to a copper conductor.
Figure 9B:
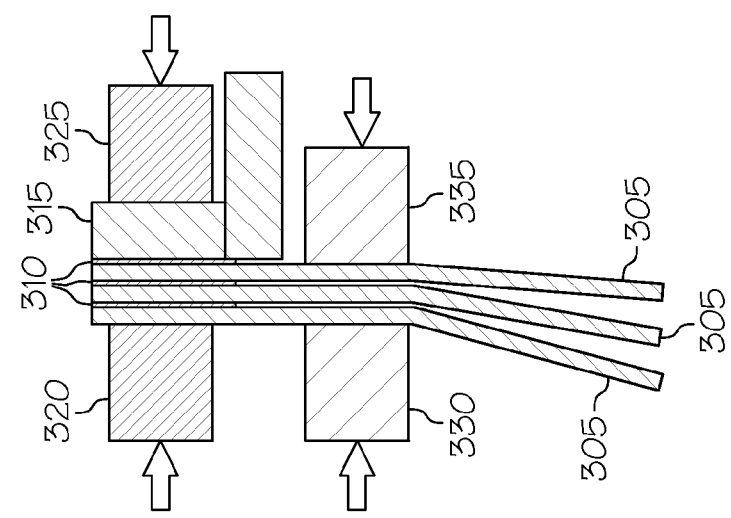
Figure 9A:
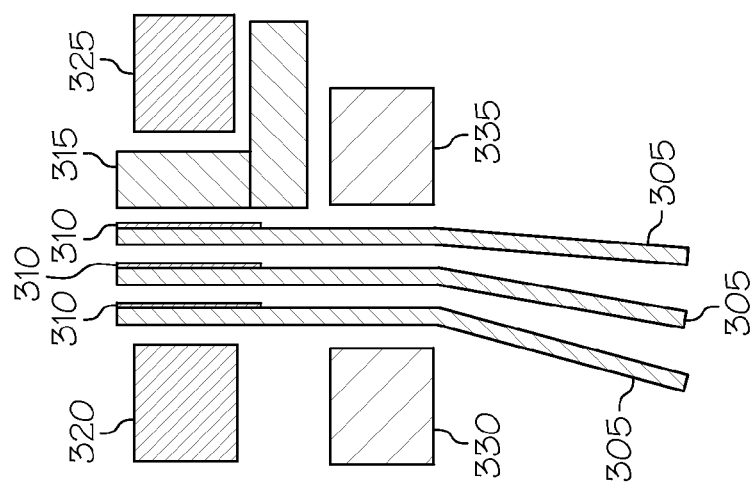

FIGS. 9A-C show a method of joining multiple sheet layers (e.g., battery cell tabs) fabricated from aluminum or copper to a heavier gauge copper sheet (e.g., conductor). The method provides excellent electrical contact, adequate strength, low cost, and high throughput. The method uses heated platens and a joining additive to initiate the metallurgical cleansing reaction at the sheet surface that results in direct metal-to-metal contact of the two substrates to be joined with no intermediate material present, i.e., solder, braze, or adhesive, and no potentially corrosive flux. The cell pouch is not shown in FIGS. 9A-C.

In FIG. 9A, there are three copper battery cell tabs 305 with a layer of the particulate reactive material 310 on the intended bonding surfaces to be welded. The reactive material can be, for example, elemental aluminum, silicon, and/or zinc, alloys thereof, alloys of these with copper, alloys of copper-phosphorus, or mixtures of these elements or alloys, as discussed above. The reactive material can be conveyed to the joint area using the methods discussed above. Alternatively, the tabs could be precoated with the metallurgical additive. This could be done in a high volume process, such as strip processing of the electrode material in coil form. Suitable processes include, but are not limited to, screen printing or spray coating the additive particles, or pre-applying a thin foil of the additive using an adhesive.

The copper battery cell tabs 305 and a copper conductor 315 are positioned between platens 320, 325. The platens 320, 325 are heated to the joining temperature which is sufficient for the reactive material 310 to diffuse into or otherwise interact with the copper battery cell tabs 305 and copper conductor 315 to form the reaction product, as discussed above. The temperature can be controlled with a thermocouple, if desired. The platens will typically be heated to the joining temperature before contact in order to reduce the process time. However, this is not required, and they could be heated to the joining temperature after contact.

The platens 320, 325 move together and exert pressure on the battery cell tabs 305 as shown in FIG. 9B. After sufficient heating, the metallurgical reaction produces intermediate volumes of liquid or semi-solid material. The reaction products react with the surfaces to be joined to expose metallurgically clean surfaces, allowing clean surfaces to be brought together for joining under pressure. Under pressure from the platens 320, 325, the reaction products are ejected from the joints, during which process the surfaces of the tabs and conductor are, respectively, brought into intimate contact and will form a strong metallurgical bond 340 as shown in FIG. 9C. Once the process is complete and the substrate surfaces were in intimate contact, the platens 320, 325 are separated.

The joint gap can be controlled using either servo guns or mechanical stops to prevent excessive thinning, if desired.

If too much heat could be transmitted down the sheet electrode into the battery cell, cooled platens 330, 335 could be clamped on the electrode just beneath the heated platens 320, 325.

Figure 10C:
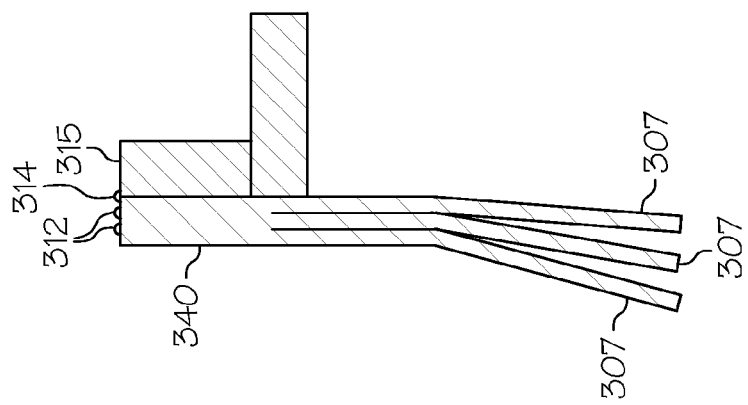
FIGS. 10A-C show a schematic cross-sectional view of another embodiment of the process illustrating three stages of development of a joint of aluminum battery cell tabs to a copper conductor.
Figure 10B:
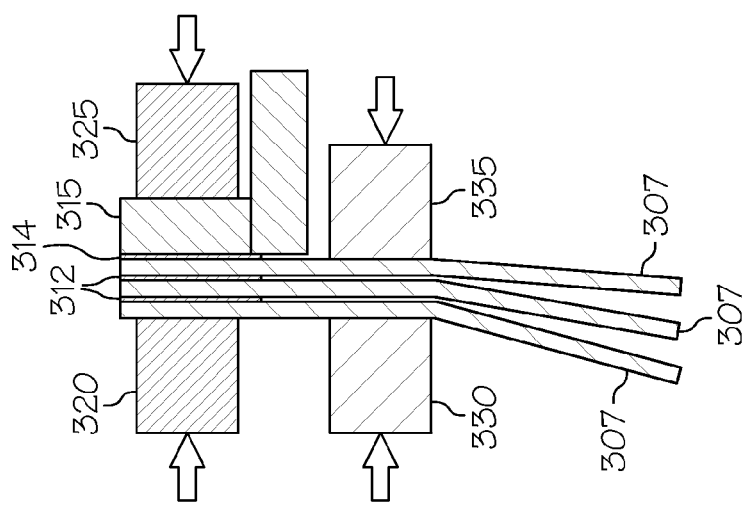
Figure 10A:
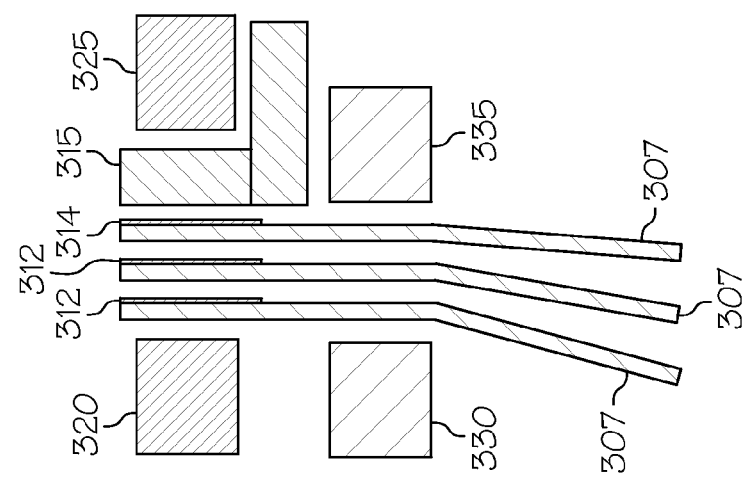

FIGS. 10A-C show a similar process with three aluminum battery cell tabs 307 being welded to a copper conductor 315. The reactive material 312 on the aluminum battery cells tabs which are to be in contact with other aluminum battery cell tabs is for aluminum to aluminum joining, while the reactive material 314 on the aluminum battery cell tab which is to be in contact with the copper conductor is for aluminum to copper joining.

The method allows high conductivity, high strength, large contact area battery tab joints. It permits a large number of battery cell tabs to be joined together. In addition, it permits dissimilar materials to be joined. It is designed to work with both aluminum and copper substrates, and with nickel plated copper.

While preferred modes for carrying out the invention have been described in detail, those familiar with the art to which this invention relates will recognize various alternative designs and embodiments for practicing the invention within the scope of the appended claims.

What is claimed is:

1. A method of forming a solid-state weld between a first metal workpiece and a second metal workpiece, the first metal workpiece being a battery cell tab and the second metal workpiece being aluminum, copper, aluminum alloy, or copper alloy, the second metal workpiece being thicker than the battery cell tab, the method comprising:
   preparing an assembly of at least two battery cell tabs and the second metal workpiece such that one of the battery cell tabs is placed between the other battery cell tab and the second metal workpiece;
   selecting a reactive material, in a form to be placed between and in contact with a first joining surface of the first metal workpiece and a first joining surface of the second metal workpiece, the reactive material being selected to react with at least the first joining surface of the first metal workpiece upon being heated to a temperature below the solidus temperature of the first metal workpiece to form a liquid-containing reaction product comprising the reactive material and the first metal, wherein the first metal workpiece and the second metal workpiece with their respective first joining surfaces are face-to-face separated by the reactive material, the amount of reactive material being predetermined to consume a specified amount of one or both workpieces in forming the reaction product in the assembly;
   pressing the assembly at a first pressure level so that the facing first joining surfaces engage the reactive material, and heating the reactive material for a predetermined time to form the reaction product and consume portions of the facing workpieces;
   forcing substantially all formed reaction product out from between the joining surfaces; and
   after forcing substantially all formed reaction product out from between the joining surfaces, holding the first joining surfaces against each other until a solid-state welded joint is formed between the first joining surfaces.

2. The method of claim 1 wherein the first metal workpiece and second metal workpiece are copper or copper alloy.

3. The method of claim 2 wherein the reactive material comprises at least one metal element of aluminum, silicon, or zinc, or alloys thereof.

4. The method of claim 2 wherein the first metal workpiece or second metal workpiece or both has a nickel coating.

5. The method of claim 4 wherein reactive material is aluminum or alloys thereof.

6. The method of claim 1 wherein the first metal workpiece is aluminum, or aluminum alloy.

7. The method of claim 6 wherein the reactive material comprises aluminum or alloys thereof.

8. The method of claim 6 wherein there are at least two first metal workpieces, wherein the first metal workpiece has a second joining surface on a side opposite the first joining surface, wherein the second first metal workpiece has a first joining surface, and further comprising:
   selecting a second reactive material, in a form to be placed between and in contact with the second joining surface of the first metal workpiece and the first joining surface of the second first metal workpiece, the second reactive material being selected to react with at least the first joining surface of the second first metal workpiece upon being heated to a temperature below the solidus temperature of the first metal to form a second liquid-containing reaction product comprising the reactive material and the first metal; and
   preparing the assembly with the first joining surface of the second first metal workpiece face-to-face with the second joining surface of the first metal workpiece separated by the second reactive material.

9. The method of claim 8 wherein the second reactive material comprises at least one metal element of copper, silicon, zinc, or magnesium, or alloys thereof.

10. The method of claim 1 further comprising increasing the pressure on the assembly to a higher pressure level to help force substantially all formed reaction product from between the joining surfaces.

11. The method of claim 1 further comprising:
   forming cavities for reactive material in the joining surfaces of at least one of the workpieces and placing reactive material in the cavities; and preparing the assembly of the workpieces so that the reactive material, when heated, reacts with the joining surface alloy material defining the cavities in forming the reaction product.

12. The method of claim 1 wherein a ratio of a thickness of the second metal workpiece to a thickness of the first metal workpiece is at least 3:1.

13. The method of claim 1 further comprising limiting a displacement of the first joining surfaces to a predetermined value.

14. The method of claim 13 wherein limiting the displacement of the joining surfaces to a predetermined value is controlled using a servo gun or a mechanical stop.

15. The method of claim 1 further comprising cooling the first metal workpiece.

16. The method of claim 15 wherein a portion of the first metal workpiece is cooled while the assembly is pressed together.

17. A method of forming a solid-state weld between a first metal workpiece and a second metal workpiece, both the first metal workpiece and the second metal workpiece being aluminum, copper, aluminum alloy, or copper alloy, the first metal workpiece being a battery cell tab and the second metal workpiece being thicker than the battery cell tab, the method comprising:
   preparing an assembly of at least two battery cell tabs and the second metal workpiece such that one of the battery cell tabs is placed between the other battery cell tab and the second metal workpiece;
   selecting a first reactive material, in a form to be placed between and in contact with a first joining surface of the first metal workpiece and a first joining surface of the second metal workpiece, the reactive material being selected to react with at least the first joining surface of the first metal workpiece upon being heated to a temperature below the solidus temperature of the first metal workpiece to form a first liquid-containing reaction product comprising the reactive material and the first metal;
   selecting a second reactive material, the second reactive material in a form to be placed between and in contact with a second joining surface of first metal workpiece on a side opposite the first joining surface and the first joining surface of the second first metal workpiece, the reactive material being selected to react with at least the first joining surface of the second metal workpiece upon being heated to a temperature below the solidus temperature of the first metal workpiece to form a second liquid-containing reaction product comprising the reactive material and the first metal, wherein the first joining surface of one first metal workpiece is face-to-face with the first joining surface of the second metal workpiece separated by the first reactive material, and the first joining surface of the second first metal workpiece is face-to-face with the second joining surface of the first metal workpiece separated by the second reactive material, the amount of respective reactive materials being predetermined to consume a specified amount of the first metal workpiece in forming the respective reaction products in the assembly;
   pressing the assembly at a first pressure level so that the facing joining surfaces engage the first and second reactive materials, and heating the first and second reactive materials for a predetermined time to form the first and second reaction products and consume portions of the facing workpieces;
   increasing the pressure on the assembly to a higher pressure level to force substantially all formed first and second reaction products out from between the joining surfaces while limiting the displacement of the joining surfaces to a predetermined value; and
   after forcing substantially all formed reaction product out from between the joining surfaces, holding the joining surfaces against each other until a solid-state welded joint is formed between the joining surfaces.

18. The method of claim 17 wherein the first metal workpiece and second metal workpiece are copper, or copper alloy.

19. The method of claim 18 wherein the first metal workpiece or second metal workpiece or both has a nickel coating.

20. The method of claim 17 wherein the first metal workpiece is aluminum, or aluminum alloy, and the second metal workpiece is copper, or copper alloy.

21. The method of claim 17 wherein the first metal workpiece is copper, or copper alloy, and the second metal workpiece is aluminum, or aluminum alloy.

22. The method of claim 17 wherein the first metal workpiece or second metal workpiece has a nickel coating.

* * * * *